US009545122B2

(12) United States Patent
Hukelmann et al.

(10) Patent No.: US 9,545,122 B2
(45) Date of Patent: Jan. 17, 2017

(54) FEED TANK AND METHOD FOR THE SIMULTANEOUS HIGH-PRESSURE AND TEMPERATURE TREATMENT OF A FOOD ITEM IN A HIGH-PRESSURE TANK

(75) Inventors: Bernhard Hukelmann, Quakenbrück (DE); Stefan Töpfl, Osnabrück (DE); Volker Heinz, Quakenbrück (DE); Fritz Kortschack, Berlin (DE)

(73) Assignees: Deutsches Institut für Lebensmitteltechnik e.V., Quakenbrück (DE); Triton GmbH, Berlin (DE)

( * ) Notice: Subject to any disclaimer, the term of this patent is extended or adjusted under 35 U.S.C. 154(b) by 116 days.

(21) Appl. No.: 14/124,903

(22) PCT Filed: Jun. 22, 2012

(86) PCT No.: PCT/EP2012/062119
§ 371 (c)(1),
(2), (4) Date: Mar. 10, 2014

(87) PCT Pub. No.: WO2012/175694
PCT Pub. Date: Dec. 27, 2012

(65) Prior Publication Data
US 2014/0186499 A1 Jul. 3, 2014

(30) Foreign Application Priority Data
Jun. 22, 2011 (DE) .......................... 10 2011 051 269

(51) Int. Cl.
*B65D 35/30* (2006.01)
*A23L 3/015* (2006.01)
(Continued)

(52) U.S. Cl.
CPC ............ *A23L 3/0155* (2013.01); *A22C 7/0046* (2013.01); *A23B 4/012* (2013.01); *A23B 5/01* (2013.01);
(Continued)

(58) Field of Classification Search
CPC .................. B65D 35/30; B65D 79/005; B65D 81/2046–81/2061; B65D 81/18; B65D 81/34; B65D 81/3438; B65D 81/3806–81/3809; B65D 81/3818–81/382; B65D 81/383–81/3832; B65D 81/3841–81/3844; B65D 81/3853–81/3855; B65D 83/0005–83/005; B65D 85/72–85/80; B65D 81/3893–81/3897; B65D 81/3476; A23L 3/0155; A23L 1/0135; A23L 1/0128; A23L 1/01; A23L 3/005; A23L 3/10; A47J 37/041; A47J 27/00; A22C 7/0046; Y10T 137/6416; Y10T 137/86035; A23B 4/01–4/012; A23B 5/01; A23B 7/01–7/012; A23B 9/04
(Continued)

(56) References Cited

U.S. PATENT DOCUMENTS 1,366,653 A * 1/1921 Harvey .................. C08B 30/12
127/32
2,546,983 A * 4/1951 Del Buttero .......... A47J 41/005
219/436
(Continued)

FOREIGN PATENT DOCUMENTS

DE 4017340 12/1991 ............... A23L 3/12
EP 0057478 8/1982 ............... A22C 7/00
(Continued)

OTHER PUBLICATIONS

International Search Report, in English, dated Dec. 17, 2012, which was issued by the International Bureau of WIPO for corresponding PCT Application No. PCT/EP2012/062119, filed on Jun. 22, 2012.

*Primary Examiner* — Drew Becker
(74) *Attorney, Agent, or Firm* — Bodner & O'Rourke, LLP; Gerald T. Bodner; Christian P. Bodner

(57) ABSTRACT

The invention relates to a feed tank for use in a high-pressure system, said feed tank having a hollow space (3) for accommodating food items, a wall (1) and a temperature-control device (5). The invention further relates to a method for the simultaneous high-pressure and temperature treatment in a high-pressure tank.

3 Claims, 3 Drawing Sheets

(51) Int. Cl.
B65D 81/20 (2006.01)
B65D 83/00 (2006.01)
B65D 79/00 (2006.01)
B65D 81/34 (2006.01)
B65D 81/38 (2006.01)
B65D 85/72 (2006.01)
A23B 4/01 (2006.01)
A23B 5/01 (2006.01)
A23B 7/01 (2006.01)
A23L 3/005 (2006.01)
A23L 3/10 (2006.01)
A22C 7/00 (2006.01)
A47J 27/00 (2006.01)
A47J 37/04 (2006.01)

(52) U.S. Cl.
CPC .............. *A23B 7/012* (2013.01); *A23L 3/005* (2013.01); *A23L 3/10* (2013.01); *A23L 5/10* (2016.08); *A23L 5/15* (2016.08); *A23L 5/17* (2016.08); *A47J 27/00* (2013.01); *A47J 37/041* (2013.01); *B65D 35/30* (2013.01); *B65D 79/005* (2013.01); *B65D 81/2061* (2013.01); *B65D 81/3476* (2013.01); *B65D 81/3895* (2013.01); *B65D 83/0022* (2013.01); *B65D 85/72* (2013.01); *Y10T 137/6416* (2015.04); *Y10T 137/86035* (2015.04)

(58) Field of Classification Search
USPC ....... 426/109, 112, 132; 220/592.01–592.28, 220/495.03, 62.12–62.13, 62.18, 601, 666; 165/53–57; 219/438–442
See application file for complete search history.

(56) References Cited

U.S. PATENT DOCUMENTS

| 3,009,813 | A | * | 11/1961 | Neumann | ............ | H05B 3/0004 426/246 |
| 4,089,982 | A | * | 5/1978 | Miyahara | ............... | A23B 4/012 426/107 |
| 4,971,819 | A | * | 11/1990 | Miyahara | ................ | F24C 7/008 219/771 |
| 5,167,344 | A | * | 12/1992 | Van Schilt | ............... | B65D 1/12 220/288 |
| 5,367,856 | A | * | 11/1994 | Kirk | ................... | B65D 83/0005 53/420 |
| 5,540,941 | A | * | 7/1996 | Stevens | ................... | B65B 55/14 426/234 |
| 5,650,180 | A | * | 7/1997 | Kumada | ........... | B05C 17/00576 206/384 |
| 6,017,572 | A | * | 1/2000 | Meyer | ................. | A23C 19/0973 426/521 |
| 6,086,936 | A | * | 7/2000 | Wilson | ................. | A23B 4/0056 426/521 |
| 2003/0008031 | A1 | * | 1/2003 | Feldman | ............ | B65D 83/0005 425/208 |
| 2005/0242128 | A1 | * | 11/2005 | Izoe | ...................... | G01F 11/025 222/390 |
| 2005/0284171 | A1 | * | 12/2005 | Harl | .................... | A47J 41/0044 62/457.2 |
| 2006/0128294 | A1 | * | 6/2006 | Rome | ................... | A23L 1/3152 452/34 |
| 2006/0169276 | A1 | * | 8/2006 | Scudder | ............... | A47G 19/027 126/263.08 |
| 2008/0099493 | A1 | * | 5/2008 | Grant | ................. | A47J 41/0072 220/592.17 |
| 2008/0292759 | A1 | | 11/2008 | Palmer | ........................ | 426/389 |
| 2009/0291174 | A1 | * | 11/2009 | Lewis | .................... | B32B 27/32 426/399 |
| 2010/0196556 | A1 | * | 8/2010 | Wheeler | ........... | B65D 83/0005 426/115 |
| 2010/0252023 | A1 | * | 10/2010 | Coffey | ................... | A47J 36/28 126/263.01 |
| 2011/0132893 | A1 | * | 6/2011 | Lin | .......................... | A45F 3/18 219/441 |

FOREIGN PATENT DOCUMENTS

| EP | 1004779 | 5/2000 | ............... F15B 1/02 |
| GB | 1506784 | 4/1978 | ............. A47J 27/08 |

* cited by examiner

FEED TANK AND METHOD FOR THE SIMULTANEOUS HIGH-PRESSURE AND TEMPERATURE TREATMENT OF A FOOD ITEM IN A HIGH-PRESSURE TANK

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The invention relates to a feed tank for use in a high-pressure system and to a method for the simultaneous high-pressure and temperature treatment of a foodstuff in a high-pressure vessel.

(2) Description of Related Art

The high-pressure treatment of foodstuffs of any kind has been known for a long time and is used for the gentle preservation of the foodstuffs on an industrial basis. A high-pressure treatment of foodstuffs at simultaneously increased temperatures allows the sterilization of foodstuffs within a shortest period.

The production of selected foodstuffs, e.g. certain sausage and meat products such as scalded sausage, meat jellies and cooked-cured products or animal food requires, in addition to the high-pressure treatment, a thermal treatment to obtain a desired solid consistency and/or a taste typical for the product (e.g. cooked flavor).

In order to be capable of performing temperature-supported pasteurization and sterilization processes, viz. high-pressure and simultaneous temperature treatments, in a high-pressure system the high-pressure systems have to be constructed such that the pressure medium in the high-pressure vessel and the wall of the high-pressure system can be cooled and heated systematically. For example, the high-pressure vessels are equipped with a temperature control jacket which ensures an operation in a temperature range of −10 to 95° C. The temperature control of the pressure medium in these temperature/high-pressure systems is realized by means of high-pressure heat exchangers.

Commercial standard systems are currently not adapted for a specific homogeneous temperature control. It follows that it is impossible to perform a temperature-supported, respectively temperature control supported pasteurization and sterilization process in a standard high-pressure system without making a number of alterations to the system.

OBJECTS AND SUMMARY OF THE INVENTION

Based on the foregoing it is the object of the present invention to provide a further developed feed tank for use in a high-pressure system and a method for the simultaneous high-pressure and temperature treatment of foodstuffs in a standard high-pressure system, so that it is possible to subject foodstuffs to the aforementioned combined high-pressure and temperature treatment in a standard high-pressure system without having to alter the standard high-pressure system.

The solution to the object is achieved by a feed tank to be used in a high-pressure system and by a method for the simultaneous high-pressure and temperature treatment of a foodstuff in a high-pressure vessel, as will be described in greater detail.

The feed tank according to the invention comprises a hollow space for receiving foodstuffs, a wall, as well as a temperature control device. It is equally possible to provide devices for the reliable separation of the material to be treated from the pressure medium in the high-pressure vessel. The feed tank preferably has a contour adapted to the high-pressure vessel of the high-pressure system, so that the feed tank can be placed in the high-pressure vessel. The contour refers, in this context, to the outline, the shape and the size of the feed tank which, filled with foodstuffs to be treated, is placed in the standard high-pressure system. The feed tank may be, for example, cylindrical or semi-cylindrical.

The feed tank is preferably multi-walled, and in a particularly preferred embodiment double-walled with a wall spacing there between. Expediently, the wall spacing can be filled. Thus, it is possible, for example, to provide a valve or a flap outside the wall spacing through which a temperature-controlling medium can be filled in.

Hence, the temperature-controlling medium is located in the wall spacing after the filling process. The temperature-controlling medium may already have a selected temperature prior to the filling process, meaning that a previous temperature control is necessary with regard to the temperature-controlling medium. The temperature-controlling medium can be, for example, water, oil, salt, paraffin, glycerin, brine, salt solution, PCM and other materials of this type. PCM stands, in this case, for Phase Change Material. In addition, latent heat storage means in the form of microscopically small polymer spheres are known which contain, in their interior, a storage medium of wax. A temperature-controlling medium, respectively insulating medium, of this type, too, can be introduced into the wall spacing. The principle of the latent heat storage also functions in the reverse direction, e.g. on the basis of a sodium acetate solution. Using such a temperature-controlling medium allows the feed tank, respectively the formed insulating jacket, to be used for stabilizing low temperatures, also in the minus range. It is required, however, that the insulating medium, respectively temperature-controlling medium, does not experience any, or only a small adiabatic temperature increase under high pressure.

On the other hand, it should also be kept in mind that the temperature-controlling medium in the feed tank may be a liquid which itself experiences a high temperature increase under pressure. This may, for example, be ethanol.

The temperature-controlling medium is chosen according to use requirement. If the foodstuff in the feed tank is to be heated, for example, previously temperature-controlled water, oil, glycerin, PCM etc. may be used. Brine, liquid nitrogen or similar substances may be used to cool the foodstuff.

While achieving the desired pressure is possible very rapidly on account of the approximately instantaneous pulse transport in the usual pressure-transmitting media (e.g. water) and is very easy to realize by a corresponding pump performance or pressure storage systems, the correct adjustment of the treatment temperature is only possible if the temperature increase generated by the compression heat in the product is known. The extent of this heating is initially dependent on the thermo-physical properties: specific heat capacity, density and specific expansivity. The work done during the compression of liquids can be estimated by means of the equation $W=\frac{1}{2}\cdot\kappa\cdot V_0\cdot\Delta p^2$, with W=compression energy, κ=compression energy, $V_0$=starting volume and Δp=pressure increase.

If pure water is used the fluid temperature increases during the compression depending on the starting temperature by approximately 2.5 to 5° C. per 100 MPa. In the presence of dissolved solids or emulsified fat, respectively oils, this increase is even higher. Table 1 shows the temperature increases of selected substances starting from a temperature of 25° C.

TABLE 1

Temperature increase ΔT with adiabatic compression of selected substances starting from 25° C.

| Substance | ΔT [κ/100 MPa] |
| --- | --- |
| water | ~3.0 |
| orange juice | ~3.0 |
| milk 2% fat | ~3.0 |
| salmon | ~3.2 |
| chicken fat | ~4.5 |
| beef fat | ~6.3 |
| olive oil | 8.7-<6.3 |
| soya oil | 9.1-<6.2 |

The selection of a suitable pressure-transmitting medium, of the temperature-controlling medium and the material of the feed tank thus allows a utilization of different compression-induced temperature rises. In addition, heat transport processes have to be considered as, in most cases, a heat transfer via the product packaging, respectively the tank wall, cannot be excluded. The heat conductivity and the dynamic viscosity are important transport parameters. As these parameters depend on the pressure and the temperature the calculation of the temperature increase is possible only if the functional correlations are known. Apart from a compression-induced heating it is particularly possible to use phase changes occurring in a pressure-induced manner for the temperature control of technical systems. The phase change enthalpy absorbed or released depending on the direction of the phase change is usually higher by several magnitudes than the specific heat capacity.

An ideal adiabatic change of state requires that the system in which the change of state takes place is perfectly insulated against heat flows of any kind. A complete heat insulation is not achievable under realistic conditions, but approximately possible by using a well insulated feed tank.

Certain substances, e.g. oils or glycerins, show a clearly higher temperature increase under the action of pressure, for example, than water. This circumstance, or also a higher starting temperature of the temperature-controlling medium ensure that the temperature gradient of the pressure medium in the high-pressure vessel does not have a negative impact on the material to be treated by the pressure treatment. The temperature-controlling medium acts like a very good insulator, which prevents the adiabatic temperature increase generated in the material to be treated by the pressure treatment from being irregular, thus resulting in production errors. In general, a fat-containing material to be treated experiences a higher temperature when subjected to pressure than other substances, e.g. water. This should be considered when the starting temperature of the temperature-controlling medium is chosen.

Apart from a previous temperature control of the temperature-controlling medium it is also possible to provide the feed tank with a temperature control device in the proximity of the wall so as to allow a heating or cooling of the wall of the feed tank in the filled condition.

The wall of the feed tank can be heated or cooled by a temperature control device, regardless of whether a single wall or multiple walls is/are provided, so that the material to be treated remains subjected to sufficient heating or cooling during the high-pressure treatment even if the temperature of the high-pressure tank wall and the pressure medium located in the high-pressure vessel clearly deviates.

As was mentioned before, a device for the temperature control of the temperature-controlling medium may be provided to this end, so as to additionally temperature-control, respectively liquefy, the materials located in the wall spacing in addition to the adiabatic heating induced by the high pressure, or to temperature-control the wall of the feed tank directly. Devices integrated in the feed tank as well as devices acting from the outside are conceivable. Inductive heating devices, and also the possible passage through a temperature control zone should be mentioned by way of example.

An adiabatic heating of the material to be treated and, if provided, of the pressure medium in the feed tank and the pressure-sensitive materials located in the wall spacing is performed during the high-pressure treatment, so that the desired temperature in the material to be treated and in the feed tank is thus obtained. The pressure medium in the feed tank is, for example, additionally introduced water or, in a mechanical form, a piston.

For the pressure and temperature treatment of material to be treated/foodstuffs, which completely fill(s) the hollow space of the feed tank, e.g. a quantity of liver sausage, a pressure medium in the feed tank is waived as this material to be treated can be filled into containers, cans, plastic cups etc. and sealed in a sterile condition after the pressure treatment.

Products which are not subjected to a particular temperature impact, e.g. spreadable raw sausage mass, may be equally pressure-treated in the feed tank provided for this purpose without a pressure medium and, subsequently, be filled under sterile conditions into small containers, cans, self-service packages etc. Preferably, the feed tank comprises an additional or sole temperature control device for influencing the wall, which can be realized, for example, by electrical heating elements inserted into the wall. The arrangement of the heating elements may also be realized in other components, respectively locations, of the feed tank.

In a particularly preferred embodiment of the invention the feed tank comprises at least one electric contact for the power supply of the temperature control device, wherein the electric contact may be arranged in the feed tank to close the electric circuit and supply the temperature control device with power only upon the contacting with a counter-contact located in the high-pressure vessel. The electric contact may be arranged, for example, at a withdrawal opening of the feed tank. The sealing means of the withdrawal opening may be realized, for example, in the form of a screw closure which is located at one of the ends of the preferably elongated feed tank. The electric contacts installed in the feed tank are arranged in such a way that the raw materials, semi-finished products or finished products located in the hollow space are flown through by the current in a gap-free manner and are temperature-controlled by means of ohmic heating, possibly in cooperation with the proposed heating elements, in the feed tank before or during the high-pressure treatment.

It is possible to stack several feed tanks corresponding to the description in a high-pressure vessel, which, filled with a foodstuff, e.g. a cuttable raw material (e.g. scalded sausage, pies, cooked-cured products), deposited on a cutting machine in the form of a cartridge, permit a sterile further processing of the cut slices after the combined heat and high-pressure treatment and the subsequent cooling of the treated semi-finished product in the feed tank.

The standard high-pressure system comprises a pressure generating system by means of which the pressure of the pressure medium in the high-pressure vessel can be generated and adjusted. The pressure generating system includes, for example, several low- and high-pressure pumps for the pressure medium. In addition, a tank may be provided for the pressure medium, e.g. water. If several feed tanks are located in the high-pressure vessel the foodstuffs located in the tanks are simultaneously subjected to a combined temperature and high-pressure treatment. It is also possible to use several high-pressure tanks, respectively high-pressure vessels, in a cascading arrangement. That is, it is possible to use several pressure tanks to receive the pressure medium with a decreasing pressure head, and to utilize the pressure stored in the pressure tanks for building up pressure in the high-pressure vessel.

After the treatment the tank(s) is/are removed from the high-pressure vessel, which removal has to be preceded by a pressure reduction in the high-pressure vessel. This pressure reduction has to be performed in a controlled manner as too fast a pressure reduction leads to undesired changes and damages of the product. If the pressure is reduced too fast the appearance, the taste and the preservability of the foodstuff to be treated could suffer. For example, a fast expansion of compressed, liquefied gases may result in freezer burn type phenomena on the food product or damages the packaging wrap.

As far as the apparatus is concerned a control means is provided by means of which the pressure reduction, respectively the rate of the pressure reduction, in the high-pressure vessel is controlled. To control the pressure reduction in the high-pressure vessel an adjustment device, respectively an adjustment valve having a pressure intensifier, is provided. The pressure intensifier is a free-piston engine for the change from a first effective pressure to a second effective pressure.

The critical moment during the pressure reduction in a high-pressure vessel is the point in time of the phase change of the gas from the liquid into the gaseous form. This change takes place at approximately 600 bar. As a consequence, the pressure reduction above 1000 bar can take place without a risk, very fast, for example in cascading small pressure tanks, to utilize this pressure again at a later time for building up pressure in the high-pressure vessel. Only as of 1000 bar it must be ensured that the pressure reduction is slowed down so as to prevent possible damages to the material to be treated, e.g. freezer burn type phenomena, and possible damages to packaging materials caused by explosion-like loads onto the product to be packaged.

The residual pressure can be transferred to the secondary side of a pressure intensifier. Reducing the pressure on the primary side of the pressure intensifier allows the safe, slower reduction of the residual pressure in the high-pressure vessel. Such an arrangement involves only an insignificant time delay during the pressure reduction, which has no delaying effect on the total cycle, however, due to the use of the stored pressure.

If it is attempted to discharge, for example, water from the high-pressure vessel in a targeted manner by using a pressure reducer, respectively a valve, this may lead to the destruction of the pressure reducer due to the high flow rate. To bypass this obstacle it is possible to control the pressure reduction in a first phase of the pressure reduction in the high-pressure vessel in such a way that, for example, up to a pressure head of 20 MPa, the pressure medium, e.g. water, is conducted into a collection vessel, respectively collection container, without pressure reducer.

The required volume of the collection container which has to withstand the pressure of more than 20 MPa is determined by the amount of the water in the high-pressure vessel fed during the pressure build-up, and is adjusted, for example, by feeding or discharging existent water before emptying the pressure vessel.

With a pressure balance between the high-pressure vessel and the collection container of approximately 20 MPa it is possible without problems to separate systems and reduce the pressure in the high-pressure vessel slowly by a valve, by bypassing spontaneously resulting expansions of substances in treated, packaged foodstuffs. The stored energy in the collection container is utilized, for example, for refilling a high-pressure vessel. At the same time, it is possible to recover the energy of the second phase of the pressure reduction, viz. the slow pressure reduction, by generating compressed air using a system This compressed air can be utilized, for example, for directly driving turbines, refrigerating machines or lifting devices. A conversion into current is conceivable, too.

The aforementioned collection container may also be referred to as a buffer storage which, as described above, serves to receive the pressure medium of the high-pressure vessel during the pressure reduction of the high-pressure vessel. An adjustment of a balance to the high-pressure vessel on a low pressure level is realized so that the residual pressure in the high-pressure vessel can be reduced, avoiding the spontaneous transition of liquid media into the gaseous state and the impairment of treatment and/or packaging material associated therewith. It can be determined by measuring the volume of the introduced pressure medium during the pressure build-up which volume must be provided in the buffer storage, respectively collection container, by the prior filling, for example, of water so as to obtain the desired balance on a low pressure level.

Summarizing, it is possible to use portions of the introduced high-pressure energy for the previous pressurization in a second high-pressure vessel, or also for the new pressure build-up of the same high-pressure vessel in terms of a recovery. The individual high-pressure vessels can be switched and controlled by valves.

It is possible to treat the material to be treated by means of contacts embedded in the feed tank, using pulsed electric fields (PEF). The PEF technology (electroporation) may be applied to make membranes of cells permeable. This may be done reversibly or irreversibly, depending on the intensity. The electroporation is realized by building up an electric field in the microsecond range. The specific energy input may be used as dose parameter for controlling the intensity of the treatment. This energy input is predetermined depending on the product properties and the product volume, e.g. by adapting the pulse rate.

The method allows, for example, to inactivate microorganisms at low temperatures, thus prolonging the preservability of foodstuffs. The advantage over the conventional pasteurization is that the nutritional and functional properties, and also the freshness of the foodstuff are largely preserved. The electroporation allows the stressing of microorganisms in the first treatment step and their inactivation by means of temperature and/or high pressure in the second step.

The temperature of the temperature-controlling medium in the feed tank should be adapted to the respective requirements and the product results to be achieved, respectively the method to be employed.

Eventually, the temperatures in the feed tank can be controlled to allow an exact adjustment of the temperatures to which the material to be treated, respectively the foodstuff, is exposed during the pressure treatment in the hollow space. Four preferred examples are given below: On the one hand, there is the temperature of the temperature-controlling medium, on the other hand, there is the temperature of the wall. The temperature-controlling medium is adjustable with respect to its temperature by preheating or by means of a heating, respectively cooling device, which is incorporated in the region of the multiple wall. That is, the temperature-controlling medium may also be referred to as temperature control device. The wall can be temperature-controlled either by the temperature control device incorporated in the wall or by the pressure-sensitive materials located in the wall spacing which may have an adiabatic temperature rise different from the material to be treated. Furthermore, it is possible to influence the temperature of the foodstuff such that it is fed into the feed tank at a previously controlled temperature.

The preheating, respectively previous temperature control, of the material to be treated can furthermore be realized in the feed tank with the pressure medium, respectively temperature-controlling medium, located in the feed tank. In such a case the wall, the pressure medium, respectively temperature-controlling medium, and the material to be treated have the same input temperatures.

The use of a fat-containing material to be treated and water as the pressure medium, respectively temperature-controlling medium, results in a temperature gradient due to the different adiabatic heating, which leads to a lower temperature control of the foodstuff in the marginal area during the high-pressure treatment. To obtain a uniform temperature control of the material to be treated both the pressure medium located in the feed tank and/or high-pressure vessel and the wall of the feed tank have to be warmer than the material to be treated so that undesired temperature gradients in the material to be treated, respectively foodstuff, are avoided. If the cooling of products is necessary during the pressure treatment the pressure medium and the temperature-controlling medium, respectively the wall of the feed tank, must not heat up more than the material to be treated.

In a possible embodiment of the feed tank according to the invention the walls are rigid, allowing the filling, closing and hermetically sealing thereof. The pressure built up in the high-pressure vessel can be transferred to the foodstuff located in the tank. The same isostatic pressure prevails in the total pressure vessel.

As the material to be treated, respectively foodstuff, has no contact to the pressure medium in the high-pressure vessel, i.e. the pressure medium located outside the feed tank, the foodstuff may be transferred into the hollow space of the feed tank unpacked. Liquid and pasty products or raw materials, e.g. meat, can be treated with high pressure and simultaneously be temperature-controlled in the feed tank according to the invention.

Preferably, the feed tank includes an insulation so as to avoid an undesired temperature input or temperature dissipation upon a contact of a foodstuff to be temperature-controlled with the wall of the tank. The insulation may be formed, for example, by an insulating layer applied to the outer surface of the feed tank. Moreover, if the wall is a multiple wall or a double wall, it is conceivable to provide an insulating medium in the wall spacing. According to another embodiment of the invention the insulation, respectively insulating medium, is thus located in the wall spacing. The use of an insulating jacket allows combined high-pressure/thermal treatments even with cooled or frozen products.

An insulating jacket can be formed, for example, by placing a double-walled, flexible insulating jacket around a tubular bag which is filled, for example, with a preheated filling material and previously temperature-controlled water, which insulating jacket is filled with the above-described temperature-controlling medium in the spacings between the individual layers. The filing of the temperature-controlling medium into the spacing of the insulating jacket may be performed prior to, during or after the insertion of the filled or to be filled tubular bag. Accordingly, it is possible to fill a tubular bag, respectively tubular film with material to be treated and seal it at both ends. Subsequently, the filled tubular bag is introduced into a fabric tube which may be formed, for example, of several fabric layers. As mentioned before, the temperature-controlling medium can be filled into the spacing. Pressure-stable plastic plates may be arranged in the head and bottom areas of the tubes so as to prevent a deformation of the filled tubes when introducing them into the high-pressure system.

In another embodiment of the invention the insulating jacket may be produced from a foamed plastic material whose voids are filled with oil, PCB, glycerin, water or another material. This insulating jacket may be used for insulating directly or enveloped by a fabric.

It is possible to use rigidly formed, respectively solidly formed, feed tanks to allow the foodstuff to be filled into containers, packages or the like under sterile conditions after the high-pressure and/or temperature treatment. For use with pasty semi-finished or finished products the feed tank may preferably be constructed such that the wall is stable and will not change either with respect to its cross-section under the influence of the high pressure.

To transfer the high pressure to the foodstuff a feed tank constructed for this purpose comprises a device which seals, like a piston or compression piston, the foodstuff to the outside, viz. toward the high-pressure vessel, and to the inside, wherein the compression piston is temporarily pushed by the pressure generated in the high-pressure vessel into the feed tank, i.e. into the hollow space for receiving the foodstuff, thus compressing the content of the hollow space in the feed tank. The foodstuff is compressed by the compression piston in the preferably elongated feed tank. It is ensured that the foodstuff is subjected to the same hydrostatic pressure that is present in the high-pressure vessel. Due to the prevailing pressure balance between the feed tank content, i.e. the foodstuff, and the interior of the high-pressure vessel no complicated sealing devices, e.g. sealing pistons, are necessary for separating the material to be treated from the pressure medium of the high-pressure vessel.

In a further developed embodiment of the invention the compression piston may be constructed to be used for ejecting the material to be treated after the high-pressure and/or temperature treatment and for filling cans, packages or the like. Preferably, the feed tank includes a removal opening, respectively filling opening, on the side opposite the compression piston, so that the compression piston pushes the treated foodstuff to the opposite side allowing the foodstuff to be removed through the aforementioned opening.

The removal openings, respectively filling openings, may be connected to filling devices which permit an aseptic further processing of the material to be treated. In these downstream, encapsulated devices the material to be treated can be loosened, mixed with the content of other, identically constructed feed tanks, brought to a predetermined grain size etc., without a recontamination taking place prior to a possible filing process.

Expediently, the feed tank includes two removal openings, respectively filling openings, which may be arranged opposite each other. The compression piston may be integrated in a removal opening, respectively filling opening. In addition, it is conceivable to provide the feed tank with two compression pistons. The compression pistons, which are preferably formed to oppose each other, thus compress the material to be treated from two sides, respectively symmetrically.

At the inlet of the compression piston into the hollow space of the feed tank preferably at least one electric contact may be formed which correspondingly supplies the temperature control device, respectively heating elements, when the electric circuit is closed. In case ohmic heating is applied the foodstuff serves as an electric resistor which is heated by the conduction of electric current. In the PEF treatment the electric contacts constitute the poles for the application of the voltage pulses.

Also, if the wall is rigid, it is conceivable to construct merely the possible closures of the removal openings, respectively filling openings elastically in such a manner that the pressure of the high-pressure vessel can be transferred to the foodstuff which is located in the hollow space. If two removal openings are provided it is possible to construct merely one of the openings with an elastic closure.

For the germ-free evacuation of the feed tank after the treatment of the foodstuff the tank is constructed to be firmly connectable to a filling or dosing device for the aseptic filling process. It is possible to provide a flange for the sterile removal on at least one removal opening so as to allow the docking of a mixing, mincing, filling, dicing or dosing device. It is possible, for example, to form the flange with an external thread allowing the filling or dosing device to be screwed on.

In an alternative embodiment the wall of the feed tank may be formed to be flexible. This may be provided both for a single wall and a multiple wall. The flexible construction is suited, above all, for the treatment of foodstuffs which must not be compressed in the longitudinal direction so as to avoid, for example, the breaking of animal bones (smoked pork chops) or the compression of self-service packages. The high pressure is transferred via the flexible wall to the foodstuff. A feed tank of this type is suited to receive packed products and loose products, respectively semi-finished products such as smoked pork chops, and to have them subjected to a high-pressure and/or temperature treatment.

The feed tank according to the invention allows a standard high-pressure system, which was not explicitly constructed for the thermal treatment, to perform temperature-guided pasteurization and sterilization processes. Neither the pressure medium nor the wall of the standard high-pressure systems are heated to a greater extent than usual when the described non-insulated or insulated feed tanks are used, so that all treatment steps, e.g. cold treatment and hot treatment, in a standard high-pressure system can be performed in a desired order. The systematic cooling or heating up of the pressure medium located in the high-pressure vessel and of the wall of the high-pressure system are not necessary.

The feed tank according to the invention will be described in more detail below by means of exemplary embodiments and with the aid of figures:

BRIEF DESCRIPTION OF THE DRAWINGS

In the figures.

DETAILED DESCRIPTION OF THE PREFERRED EMBODIMENTS

Figure 1:
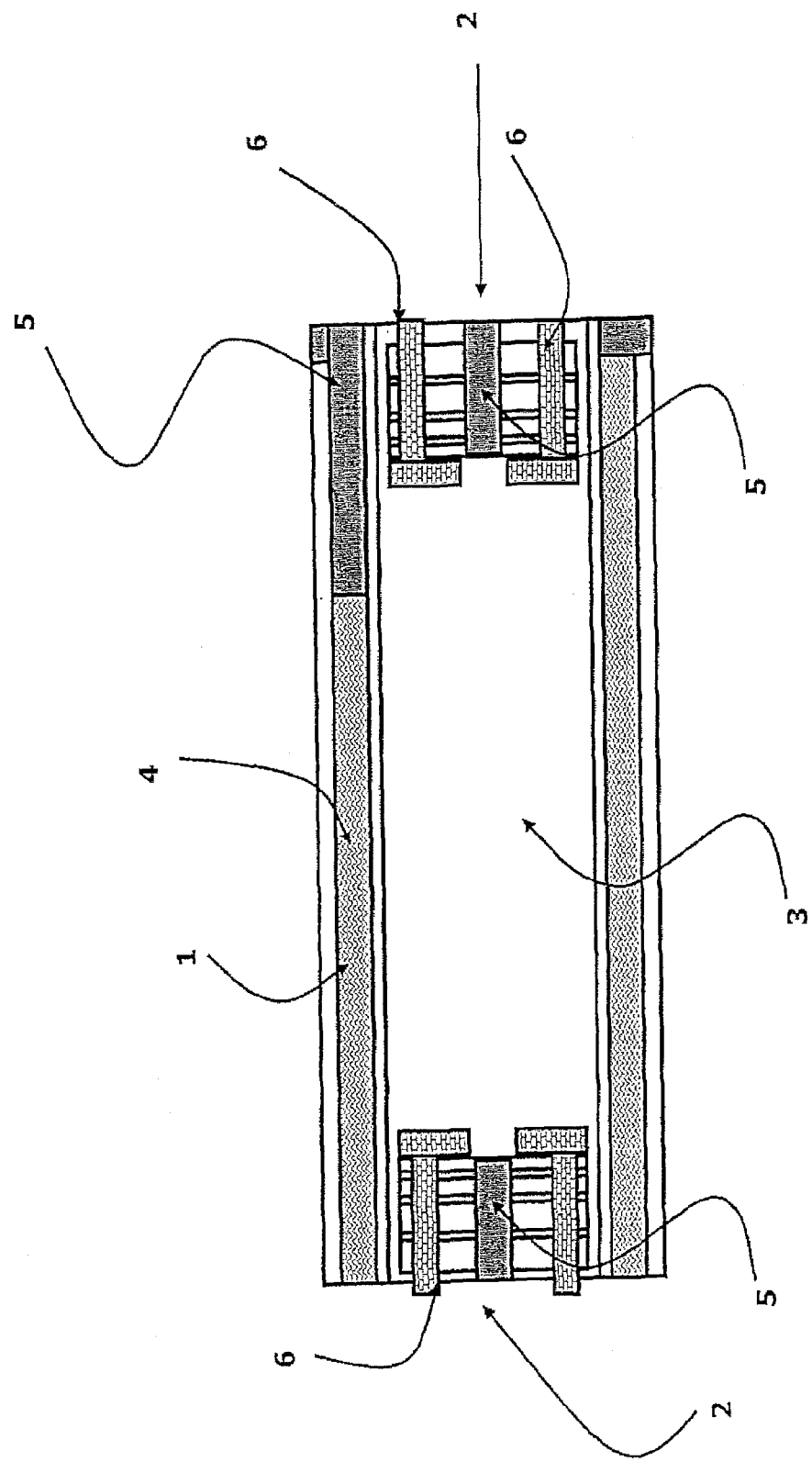
FIG. 1 shows a feed tank.

FIG. 1 shows the basic construction of a feed tank. A wall 1 and the removal openings 2 define a hollow space 3 for receiving the foodstuff to be treated. In the embodiment shown a multiple wall, and explicitly a double wall, with a wall spacing 4 is formed. This spacing contains a temperature-controlling medium. The temperature-controlling medium may be water, oil, salt, paraffin, brine, PCM or a salt solution. The temperature-controlling medium may already be preheated, respectively cooled, when it is filled into the wall spacing 4. This may be realized by a valve. Depending on the foodstuff to be treated the medium located in the wall spacing may also serve as an insulating medium of an insulation of the feed tank.

In addition, another temperature control device 5 is provided, which may be configured to temperature-control the temperature-controlling medium, on the one hand, and to directly temperature-control the wall 1, on the other hand. It is also provided to arrange another temperature control device 5 in the region of the removal opening 2.

In the region of the two removal openings 2 electric contacts 6 are respectively provided which, upon contact with counter-contacts mounted in the high-pressure vessel or separately, outside the high-pressure vessel, close an electric circuit and supply the temperature control devices 5, respectively electroporation device, with power. In addition, it is important to note that the contacts in the feed tank have a full-surface effect to ensure that all parts of the material to be treated are flown through by the current.

As can be seen in the figure the feed tank has an elongated geometry, which may also have other physical conditions adapted to the high-pressure vessel of the standard high-pressure system. The removal openings 2 are located on the ends of the feed tank which oppose each other in the longitudinal direction. The closing devices associated with the removal openings may be designed, inter alia, as screw caps which may have, for example, an elastic membrane. The foodstuff to be treated is introduced through the openings into the hollow space 3 prior to the treatment and is removed through the same openings after the treatment.

Figure 2:
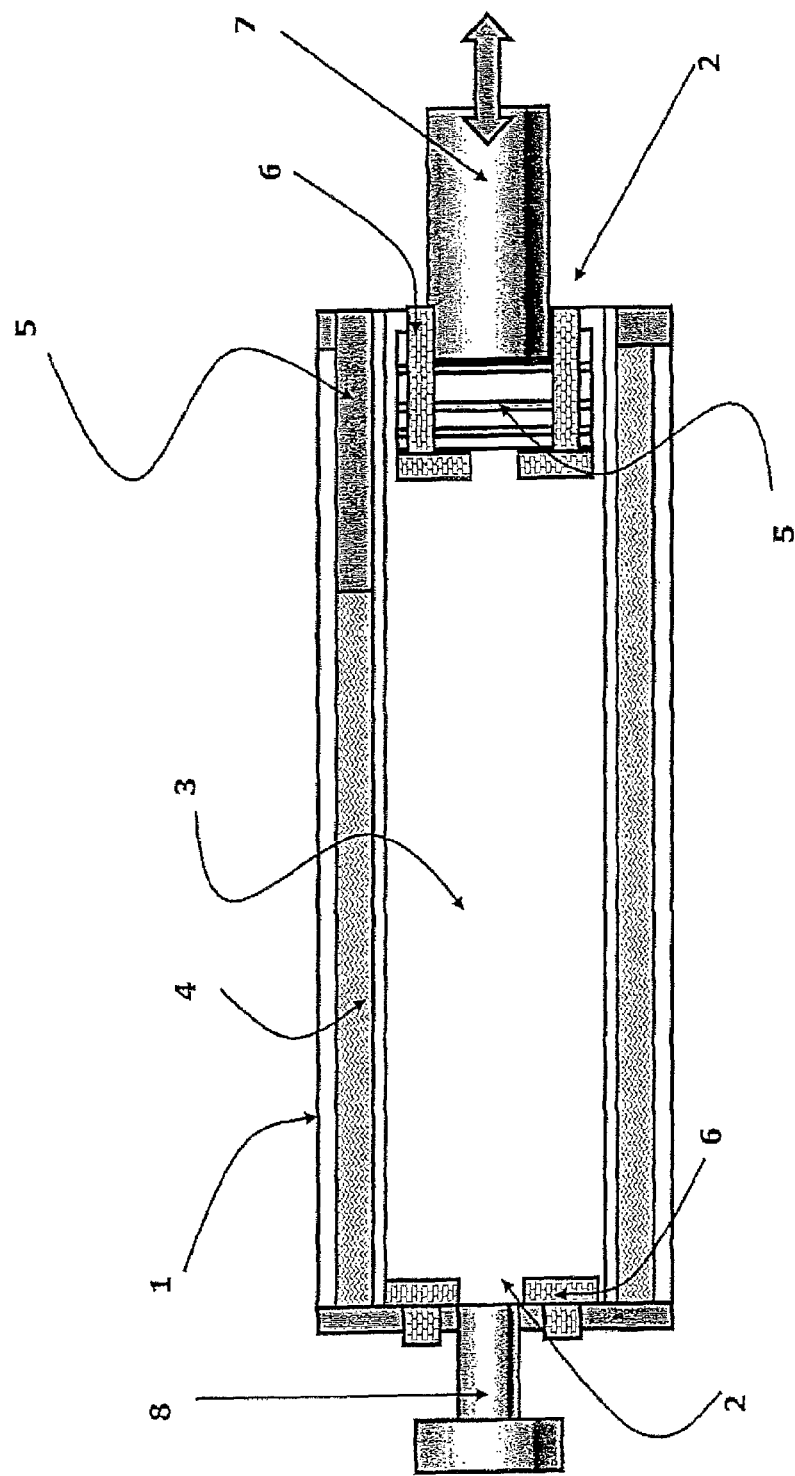
FIG. 2 shows a feed tank with a compression piston.

FIG. 2 shows a feed tank having a compression piston 7. The compression system is integrated in a removal opening and forms the closure of same, wherein the piston is situated at the opposite end of another removal opening 2. This embodiment of the feed tank is suited particularly well for the treatment of pasty semi-finished or finished products. Same do not change their cross-section during the pressure and temperature treatment and are merely compressed in the longitudinal direction owing to the pressurization by the compression piston.

Firstly, the pasty foodstuff is introduced through the two removal openings 2 into the hollow space 3. Then, the one removal opening is provided with a sealing plug 8 while the piston 7 is introduced into the opposite removal opening. Electric contacts 6 are provided at both ends of the feed tank, with a temperature control device 5 being moreover provided in the region of the compression piston.

Next, the high-pressure and temperature treatment is performed, with the compression piston being pushed in the longitudinal direction into the hollow space 3 so that the material to be treated located there is compressed. Upon the completion of the treatment steps the sealing plug 8 is removed so that the treated foodstuff can be removed through this removal opening by means of the compression piston 7. Preferably, the compression piston therefore has a length that corresponds at least to the distance between the two removal openings 2, so that the material to be treated is ejected through the removal opening, which is situated opposite the compression piston 7, due to the pressure exerted by the compression piston 7.

For the germ-free evacuation of the feed tank after the treatment of the foodstuff the tank is constructed to be firmly connectable to a filling or dosing device. Therefore, the removal opening 2, which is originally provided with a sealing plug 8, is formed with a coupling device, e.g. a flange with an external thread (not illustrated), so that the filling, mixing, mincing or dosing device can be coupled thereto, respectively connected by screwing.

Figure 3:
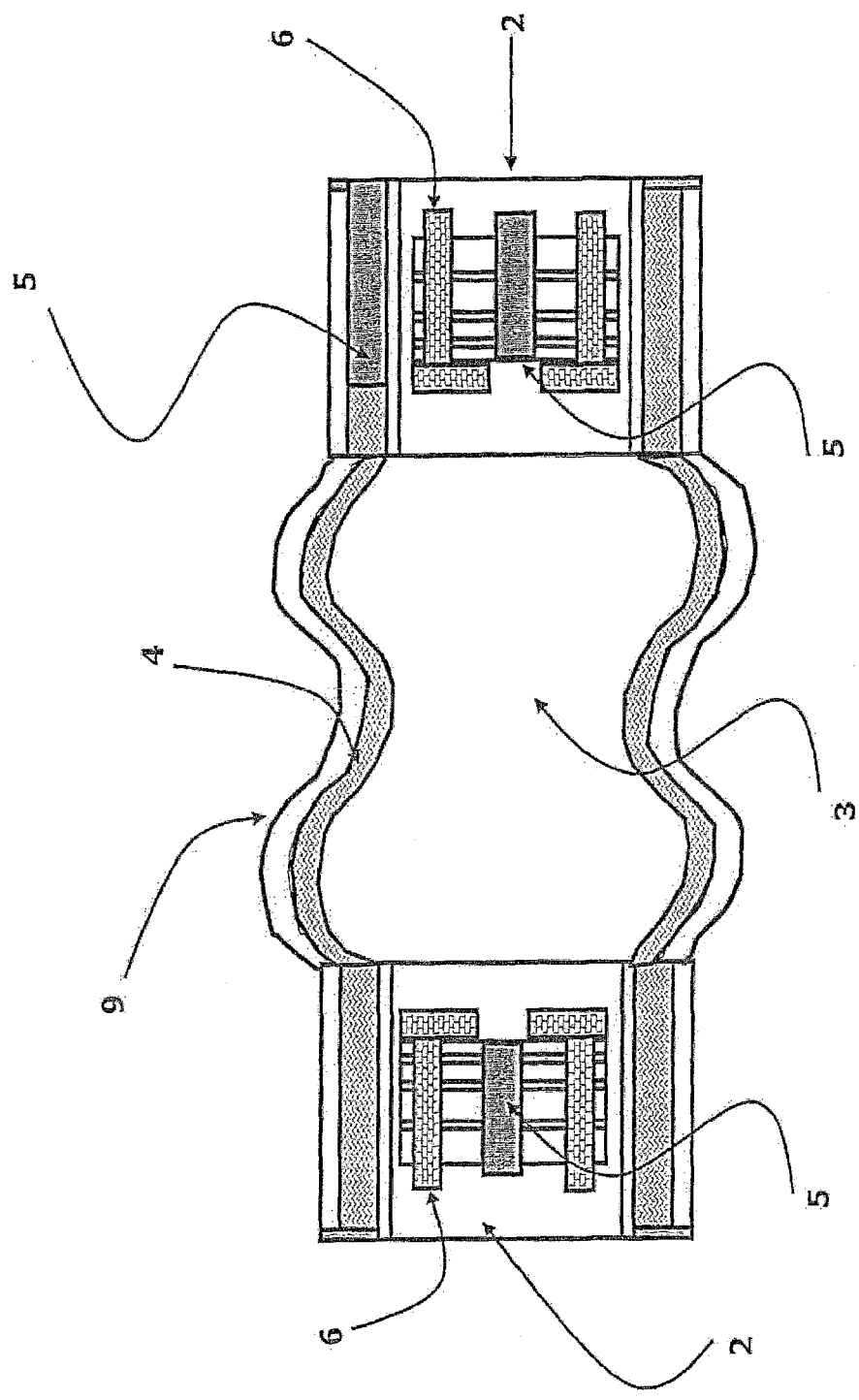
FIG. 3 shows a feed tank with a flexible wall.

FIG. 3 shows another embodiment focusing at a flexible, respectively elastic, wall 9. As can be seen in the figure such a wall configuration equally allows the construction of a multiple wall, respectively double wall, with a fillable wall spacing 4 there between.

This embodiment of the feed tank according to the invention is suited, above all, for the treatment of foodstuffs, respectively meat products and sausage products, which must not be compressed in the longitudinal direction, for example, to avoid the breaking of animal bones. In this design, the high pressure is applied to the foodstuff by the flexible wall 9. A feed tank of this type is suited for the treatment of both packed products and loose products.

Other than that, this feed tank equally comprises electric contacts 6, temperature control devices 5 and removal openings 2.

LIST OF REFERENCE NUMBERS 1 wall
2 removal opening
3 hollow space
4 wall spacing
5 temperature control device
7 electric contact
7 compression piston
8 sealing plug
9 flexible wall

What is claimed is:

1. Feed tank for use in a pressure system,
characterized in that
the feed tank comprises a first axial end and a second axial end disposed opposite the first axial end, a hollow space for receiving foodstuffs for batch processing, a wall as well as a temperature control device,
wherein the wall is multi-walled with a wall spacing there between,
wherein a temperature-controlling medium is located in the wall spacing,
wherein the first axial end has formed therein a first opening and the second axial end has formed therein a second opening,
wherein the feed tank comprises at least one electric contact, whereby the electric contact is arranged in such a way that raw materials, semi-finished products or finished products located in the hollow space are flown through by the electric current completely and are temperature-controlled by means of ohmic heating;
wherein the feed tank further comprises at least one compression piston, the compression piston being axially extendable at least partially through the second opening formed in the second axial end of the feed tank into the hollow space to eject the foodstuffs therein through the first opening in the first axial end of the feed tank;
wherein the first axial end of the feed tank includes a flange situated at the first opening formed in the first axial end, the flange being engageable with a mixing, mincing, filling, dicing or dosing device,
wherein the combination of the compression piston and flange facilitates sterile, germ-free evacuation of the feed tank after treatment of the foodstuffs therein.

2. Feed tank according to claim 1,
characterized in that
the wall is flexible.

3. Feed tank according to claim 1,
wherein the temperature-controlling medium is at least one of water, oil, salt, paraffin, brine, PCM, salt solution, glycerin, liquid nitrogen, ethanol and sodium acetate.

* * * * *